US012209953B2

(12) United States Patent
Jensen (10) Patent No.: US 12,209,953 B2
(45) Date of Patent: Jan. 28, 2025

(54) NON-SPATIAL MEASUREMENT CALIBRATION METHODS AND ASSOCIATED SYSTEMS AND DEVICES

(71) Applicant: Radiant Vision Systems, LLC, Redmond, WA (US)

(72) Inventor: Jens J. Jensen, Woodinville, WA (US)

(73) Assignee: RADIANT VISION SYSTEMS, LLC, Redmond, WA (US)

( * ) Notice: Subject to any disclaimer, the term of this patent is extended or adjusted under 35 U.S.C. 154(b) by 274 days.

(21) Appl. No.: 17/772,491

(22) PCT Filed: Oct. 30, 2020

(86) PCT No.: PCT/US2020/058205
§ 371 (c)(1),
(2) Date: Apr. 27, 2022

(87) PCT Pub. No.: WO2021/087256
PCT Pub. Date: May 6, 2021

(65) Prior Publication Data
US 2022/0381678 A1 Dec. 1, 2022

Related U.S. Application Data
(60) Provisional application No. 62/928,237, filed on Oct. 30, 2019.

(51) Int. Cl.
*G01N 21/27* (2006.01)
*G01J 1/42* (2006.01)
(Continued)

(52) U.S. Cl.
CPC .............. *G01N 21/274* (2013.01); *G01J 1/42* (2013.01); *G01M 11/0221* (2013.01);
(Continued)

(58) Field of Classification Search
CPC ................. G01N 21/274; G01N 21/94; G01N 2201/1273; G01J 1/42; G01J 2001/4247; G01M 11/0221; H04N 17/002
See application file for complete search history.

(56) References Cited

U.S. PATENT DOCUMENTS

| | | | |
|---|---|---|---|
| 9,135,851 B2 | 9/2015 | Rykowski | |
| 2005/0205785 A1* | 9/2005 | Hornback | G01J 5/22 348/E5.081 |
| 2019/0204236 A1* | 7/2019 | Michniewicz | F21V 3/02 |

FOREIGN PATENT DOCUMENTS

| | | |
|---|---|---|
| WO | 02084213 A1 | 10/2002 |
| WO | 2006050978 A3 | 8/2006 |
| WO | 2007001327 A2 | 1/2007 |

OTHER PUBLICATIONS

Becker, M.E. et al., "Evaluation and characterization of display reflectance." Displays Devices, Dempa Publications, Tokyo, vol. 19, No. 1, Jun. 30, 1998, pp. 35-54.
(Continued)

*Primary Examiner* — Dominic J Bologna
(74) *Attorney, Agent, or Firm* — Perkins Coie LLP (57) ABSTRACT

Systems and methods for calibrating non-spatial measurements of a device under test (DUT) for misalignment between the DUT and a non-spatial measurement device are disclosed herein. A system for generating a misalignment calibration database can include, for example, a non-spatial measurement device and a high-precision translation stage. The system can generate a misalignment calibration database by taking measurements of a DUT at multiple misalignment locations. A system for measuring a DUT can include, for example, a spatial measurement device, a non-spatial measurement device, a translation stage, and/or a carrier tray. The system can capture measurements of the DUT at a first position and calibrate the measurements for
(Continued)

misalignment using calibration data corresponding to the first position. For example, the system can retrieve calibration data from a calibration misalignment system that was taken at the same and/or different locations proximate the position of the DUT.

12 Claims, 6 Drawing Sheets

(51) Int. Cl.
*G01M 11/02* (2006.01)
*G01N 21/94* (2006.01)
*H04N 17/00* (2006.01)

(52) U.S. Cl.
CPC ...... *G01N 21/94* (2013.01); *G01J 2001/4247* (2013.01); *G01N 2201/1273* (2013.01); *H04N 17/002* (2013.01)

(56) References Cited

OTHER PUBLICATIONS

Extended European Search Report mailed Nov. 6, 2023 in European Patent Application No. 20881598.5, 9 pages.
Jarvenpaa, T. et al., "Optical characterization of autosteroscopic 3-D displays." Journal of the Society for Information Display, vol. 16, No. 8, Aug. 1, 2008, pp. 825-833.
International Search Report and Written Opinion mailed Feb. 26, 2021 in International Patent Application No. PCT/US20/58205, 22 pages.

* cited by examiner

NON-SPATIAL MEASUREMENT CALIBRATION METHODS AND ASSOCIATED SYSTEMS AND DEVICES

CROSS-REFERENCE TO RELATED APPLICATION

This application is a U.S. national stage patent application submission of International Patent Application No. PCT/US20/58205, filed Oct. 30, 2020, that claims the benefit of U.S. Provisional Patent Application No. 62/928,237, filed Oct. 30, 2019, International Patent Application No. PCT/US20/58205 and U.S. Provisional Patent Application No. 62/928,237 are incorporated by reference herein in their entireties.

TECHNICAL FIELD

The present disclosure relates generally to non-spatial measurement calibration methods and, more particularly, to methods (and associated systems and devices) for calibrating non-spatial measurements for misalignment orientation and/or magnitude.

BACKGROUND

Spatial imaging cameras are optical instruments used to capture still images or to record moving images. These cameras typically include a lens and an image capture mechanism (e.g., a charge coupled device (CCD) image sensor or a complementary metal-oxide-semiconductor (CMOS) image sensor). To capture an image, the lens focuses light from a scene onto the image capture mechanism, which captures/records the color and brightness at multiple points within that image. As a result, imaging cameras capture spatial information (e.g., relative location, shape, size, and/or orientation data) of the scene and/or of objects within the scene.

In contrast, non-spatial cameras are instruments used to capture data of a scene and/or objects within the scene that are independent of geometric considerations. These cameras typically transform an image from the spatial regime into other regimes, such as Fourier space, angular space, spectral space, etc. For example, one type of non-spatial camera is a conoscope that is used to measure an angular distribution of particular wavelengths of light within a scene. Because non-spatial cameras transform an image out of the spatial regime, spatial information of the scene or objects within the scene is not available in resulting measurements.

Both spatial and non-spatial cameras can be used in industry in addition to or in lieu of human vision for a variety of applications. One such application is product inspection. During product inspection, cameras capture data of a device under test (DUT) to ensure that the DUT meets specified and/or acceptable parameters before the DUT is incorporated into other devices, shipped, and/or sold.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

A. Overview

The following disclosure describes non-spatial measurement calibration methods and associated systems and devices. As described in greater detail below, methods and/or systems configured in accordance with various embodiments of the present technology are configured to generate a misalignment calibration database and/or use the misalignment calibration database to calibrate measurements of a DUT produced by a product inspection system. For example, the present technology is configured to generate and use misalignment calibration databases to optimize misalignment magnitudes and/or orientations between DUTs and non-spatial measurement devices. In some embodiments, the non-spatial measurement devices include conoscopes configured to work with any size of illumination sources (e.g., large sources overfilling entrance apertures of the conoscopes or small sources where the sizes of the illumination sources specify the requisite sizes of the entrance apertures of the conoscopes), as well as illumination sources projecting light in any wavelength. In general, the present technology can be utilized for all camera systems with optics that transform images from the imaging (spatial) regime into other regimes (e.g., Fourier space, angular space, spectral space, etc.) where spatial information is not available and cannot be used to optimize alignment of the DUT and the camera systems. The calibration corrects for any misalignment between the non-spatial measurement device of the inspection system and the DUT reflected in resulting measurements of the DUT.

Some embodiments of the present technology use a misalignment calibration system to generate a misalignment calibration database that can subsequently be used to calibrate a product inspection system. The misalignment calibration system can include a high-precision mechanical translation stage and a non-spatial camera. In operation, the high-precision translation stage positions a DUT (e.g., an emitting source) within a field of view (FOV) of the non-spatial camera. In particular, the high-precision translation stage positions the DUT at several locations within the FOV of the non-spatial camera while the non-spatial camera captures one or more measurements of the DUT at each location. The measurements, calibration images generated based at least in part on the measurements, and/or corresponding locations of the DUT are stored as misalignment calibration data in entries of the misalignment calibration database.

These and other embodiments of the present technology use a non-spatial product inspection system to inspect (e.g., measure, examine, etc.) one or more features of a DUT. The inspection system can include a spatial camera, a non-spatial camera, a translation stage, and/or a carrier tray. In operation, the translation stage positions the carrier tray within a FOV of the spatial camera while a DUT is positioned on the carrier tray. In turn, the spatial camera determines a position of the DUT on the carrier tray (e.g., relative to the center of or another point on the carrier tray). In some embodiments, the translation stage subsequently positions the carrier tray within a FOV of the non-spatial camera, and the non-spatial camera takes one or more measurements of the DUT. Using the determined position of the DUT on the carrier tray, the inspection system retrieves corresponding misalignment calibration data from a misalignment calibration database. For example, the inspection system retrieves misalignment calibration data corresponding to one or more locations that are at and/or proximate the determined position of the DUT. In turn, the misalignment calibration data is used to calibrate measurements of the DUT taken by the non-spatial camera for any misalignment between the DUT and the FOV of the non-spatial camera.

As discussed above, both spatial and non-spatial cameras can be used in industry in addition to, or in lieu of, human vision for a variety of applications. One such application is product inspection. During product inspection, cameras capture data of a DUT to ensure that the DUT meets specified and/or acceptable parameters before the DUT is incorporated into other devices, shipped, and/or sold.

To ensure the cameras capture accurate and appropriate data of a DUT, the cameras must either be spatially aligned with the DUT or be calibrated for a known misalignment. Spatial information regarding the location of a DUT relative to a camera can be used to determine misalignment orientation and magnitude and/or to optimize alignment. This spatial information can be captured in measurements taken by spatial cameras. As a result, product inspection systems can use one or more measurements of a DUT taken by a spatial camera to determine misalignment orientation and magnitude and/or to optimize alignment between the DUT and the spatial camera. In contrast, spatial information is not available in measurements taken by non-spatial cameras. As such, a product inspection system is unable to rely on measurements taken by a non-spatial camera to determine misalignment orientation and magnitude and/or to optimize alignment between the DUT and the non-spatial camera.

Furthermore, the inventor has recognized that measurements captured by a non-spatial camera are only valid and/or accurate for a limited mechanical tolerance between a DUT and a FOV of the non-spatial camera. Thus, conventional inspection systems using non-spatial cameras must fully (e.g., perfectly, optimally, or within a limited mechanical tolerance) align the DUT with the FOV of the non-spatial camera before taking measurements of the DUT. To accomplish the needed alignment, conventional inspection systems use a spatial camera and/or a high-precision mechanical translation stage. In particular, conventional inspection systems use the spatial camera to determine the location of a DUT and/or use the high-precision mechanical translation stage to fully align the DUT with the FOV of the non-spatial camera or to fully align the FOV of the non-spatial camera with the DUT.

The alignment procedures of conventional product inspection systems, however, are costly in both investment and time. For example, the high-precision mechanical translation stage is an expensive piece of equipment, the price of which increases with the mechanical precision required to fully align a DUT with the FOV of a non-spatial camera. Furthermore, an inspection throughput (e.g., a number of DUT's inspected within a given period of time) of a conventional product inspection system is reduced with the need to determine the position of each DUT and to fully align it with the FOV of the non-spatial camera.

These costs are further exacerbated by variations in positions of DUT's within other devices. For example, a DUT can be integrated into another (e.g., larger) device before being inspected by a product inspection system, and the position of the DUT within the device can vary from device to device. Therefore, conventional inspection systems in these scenarios must (i) determine the position of a DUT within a device using a spatial camera and (ii) determine how best to position and/or orient each device such that the DUT is fully aligned with the FOV of the non-spatial camera. Thus, in these scenarios, the inspection throughput can be reduced even more in convention inspection systems.

In contrast, embodiments of the present technology generate a misalignment calibration database that stores misalignment calibration data and that is subsequently used by a product inspection system to calibrate measurements taken by a non-spatial camera for a larger area and/or a greater number of misalignment positions. For example, the product inspection system can determine a location of a DUT on a carrier tray (e.g., using a spatial camera). In addition, the inspection system can (e.g., previously, subsequently, and/or simultaneously) align the carrier tray with a FOV of a non-spatial camera and can use the non-spatial camera to capture one or more measurements of the DUT. Using the determined location of the DUT on the carrier, the product inspection system can retrieve corresponding misalignment calibration data from the misalignment calibration database and can use the misalignment calibration data to calibrate (e.g., correct, adjust, etc.) the one or more measurements of the DUT taken by the non-spatial camera for any misalignment between the DUT and the FOV of the non-spatial camera.

In this manner, the present technology obviates the practice of fully aligning a DUT with a FOV of a non-spatial camera before measuring the DUT. In turn, the present technology obviates the use of costly high-precision mechanical translation stages in product inspection systems. Furthermore, because a carrier tray is larger than a DUT and is aligned with a FOV of a non-spatial camera in the same manner regardless of the position of the DUT, the present technology is expected to quickly and easily align the carrier tray with the FOV of the non-spatial camera to quickly and easily take one or more measurements of the DUT, thereby increasing the inspection throughput of a product inspection system.

Certain details are set forth in the following description and in FIGS. 1-6 to provide a thorough understanding of various embodiments of the present technology. However, other details describing well-known structures and systems often associated with product inspection and/or machine vision systems and associated methods are not set forth below to avoid unnecessarily obscuring the description of various embodiments of the technology.

Many of the details, dimensions, angles, and other features shown in FIGS. 1-6 are merely illustrative of particular embodiments of the technology. Accordingly, other embodiments can have other details, dimensions, angles, and features without departing from the spirit or scope of the present technology. In addition, those of ordinary skill in the art will appreciate that further embodiments of the technology can be practiced without several of the details described below.

B. Embodiments of Non-Spatial Camera Calibration Systems and Product Inspections Systems, and Associated Methods FIG. 1 and the following discussion provide a brief, general description of suitable environments in which a system for generating a misalignment calibration database and a system for measuring a device under test (DUT) may be implemented. Although not required, some aspects of the technology are described in the general context of computer-executable instructions, such as routines executed by a general-purpose computer, a personal computer, a server, or other computing system. The technology can also be embodied, at least in part, in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random-access memory (RAM), read-only memory (ROM), flash memory, or the like, or a combination of such components. Computer-executable instructions may also be stored in one or more storage devices such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or that implement particular abstract data types.

Figure 1:
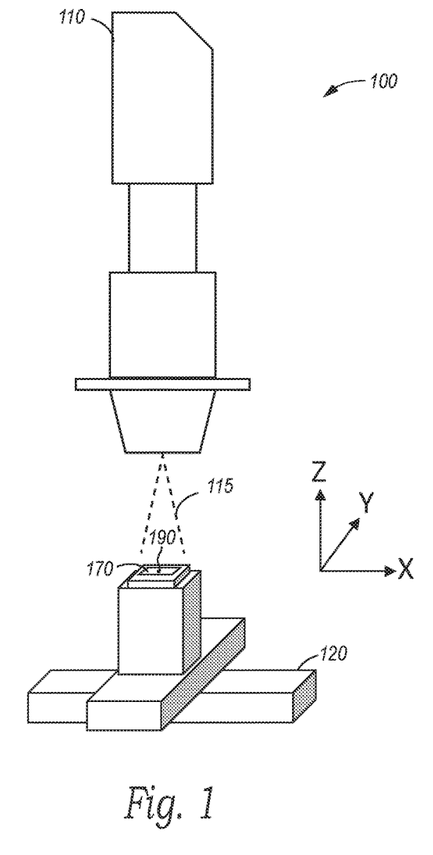
FIG. 1 is a schematic diagram of a misalignment calibration system configured in accordance with various embodiments of the present technology.

FIG. 1 is a schematic diagram of a misalignment calibration system 100 ("the calibration system 100" or "the system 100") configured in accordance with various embodiments of the present technology. As shown, the calibration system 100 includes a non-spatial machine or camera 110 and a high-precision translation stage 120 ("the translation stage 120"). Although not shown so as to avoid unnecessarily obscuring the description of the embodiment of the technology, the system 100 can also include other hardware and/or components necessary for machine vision, including one or more spatial cameras, one or more processors, software, and/or one or more output devices. For example, the system 100 can include signal processing hardware and/or software to analyze data captured by the non-spatial camera 110, and/or a display for providing feedback to a system user.

In operation, the calibration system 100 is configured to generate a misalignment calibration database for use in a product inspection system to measure (e.g., inspect, evaluate, etc.) a DUT 190 (e.g., for defects and/or other characteristics). In FIG. 1, the DUT 190 is an emitting device, such as an infrared emitter. In other embodiments, however, the DUT 190 can be any other object and/or device that can be subjected to machine vision and/or inspection. For example, the DUT 190 in other embodiments can be any object and/or device configured to project and/or reflect light (e.g., in a spectrum other than infrared). As another example, the DUT 190 can be any other object and/or device having one or more (e.g., mechanical, electrical, optical, etc.) features that can be subjected to machine vision and/or inspection using a non-spatial measurement device.

The non-spatial camera 110 of the calibration system 100 is configured for machine vision of non-spatial characteristics and/or features of a DUT 190. In the illustrated embodiment, for example, the non-spatial camera 110 is a conoscope configured to measure an angular distribution of radiation within a field of view 115 ("the FOV 115") of the non-spatial camera 110. In other embodiments, however, the non-spatial camera 110 can be another type of non-spatial measurement device configured to (i) transform an image from a spatial regime to a non-spatial regime (e.g., Fourier space, angular space, spectral space, etc.) and/or (ii) measure other types of non-spatial characteristics and/or features of the DUT 190. Although not shown so as to avoid unnecessarily obscuring description of the illustrated embodiment, the non-spatial camera 110 can be held in a permanent or temporary position with a mechanical fixture or frame positioned outside of the FOV 115 of the non-spatial camera 110.

As noted above, the non-spatial camera 110 can include and/or can be operably coupled to other hardware, software, and/or output devices. For example, the non-spatial camera 110 can be coupled to a computer (not shown) that includes signal processing hardware and/or software to analyze data (e.g., measurements) captured by the non-spatial camera 110. Additionally, or alternatively, the non-spatial camera 110 can be coupled to one or more displays configured to provide feedback to a system user. In these and other embodiments, the non-spatial camera 110 can include onboard signal processing hardware and/or software and/or can include an onboard display. Furthermore, although the calibration system 100 is shown with a single non-spatial camera 110 in FIG. 1, the system 100 can include more than one non-spatial measurement device (e.g., more than one non-spatial camera 110) in other embodiments (e.g., to measure the same and/or one or more other features of the DUT 190). In some embodiments, a spatial measurement system can be integrated into the non-spatial camera 110. For example, the non-spatial camera 110 can include a (e.g., semitransparent and/or reflective) mirror and an optical measurement device configured to capture spatial information of objects positioned within the FOV 115 of the non-spatial camera 110.

The high-precision translation stage 120 of the calibration system 100 is configured to position the DUT 190 at multiple locations within the FOV 115 of the non-spatial camera 110 to a high degree of precision. In this regard, the translation stage 120 can be configured for motion in multiple dimensions to position the DUT 190 at specific locations within the FOV 115 of the non-spatial camera 110. For example, the translation stage 120 can be configured to move along and/or rotate about one or more axes parallel to the X, Y, and/or Z axes illustrated in FIG. 1. Examples of tolerated degrees of precision provided by the high-precision translation stage 120 for positioning the DUT 190 within the FOV 115 of the non-spatial camera include 50 μm or less, 100 μm or less, and/or 1000 μm or less. In these and other embodiments, the tolerated degree of precision required can be dependent on (i) physical dimensions and/or other characteristics of the DUT 190 and/or (ii) characteristics of the non-spatial camera (e.g., the size of the FOV 115). Although not shown in FIG. 1, the translation stage 120 can include clamps and/or stands to fixedly position, orient, and/or hold the DUT 190 on a platform or stage 170 presented to the non-spatial camera 110.

Figure 2:
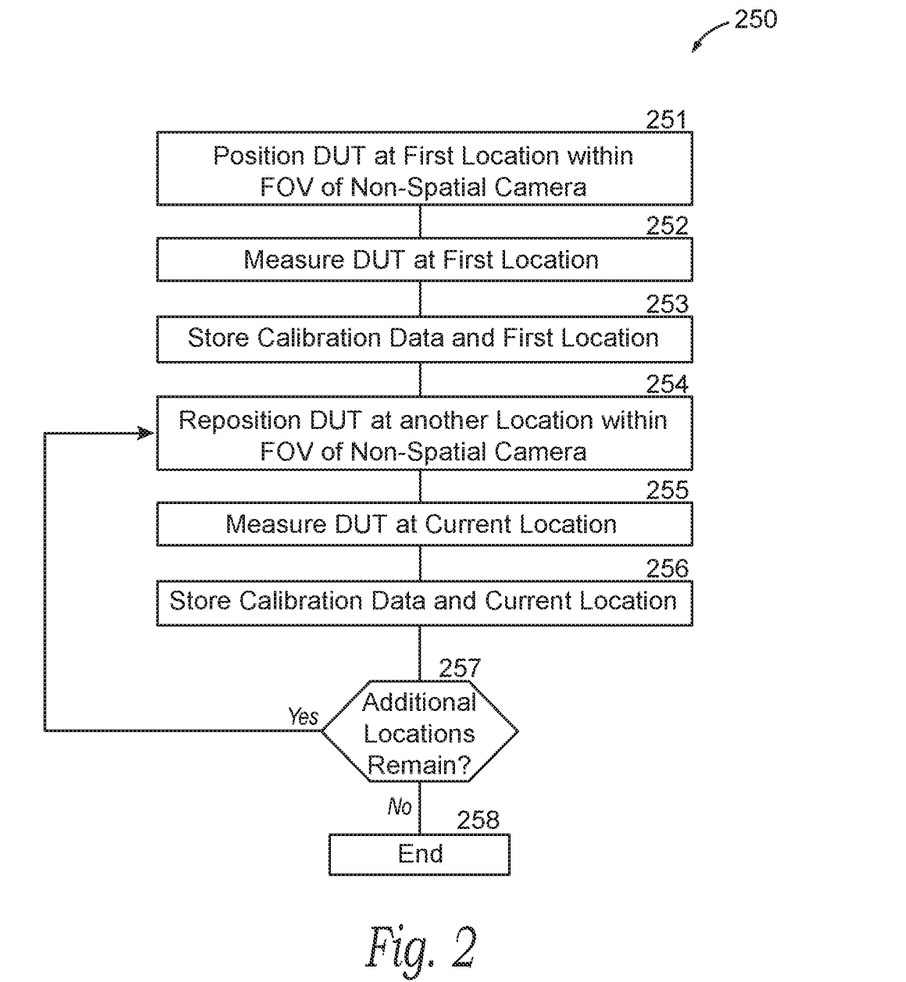
FIG. 2 is a flow diagram illustrating a routine for generating a non-spatial misalignment calibration database configured in accordance with various embodiments of the present technology.

FIG. 2 is a flow diagram illustrating a routine 250 for generating a non-spatial misalignment calibration database configured in accordance with various embodiments of the present technology. In some embodiments, all or a subset of one or more steps of the routine 250 can be executed at least in part by a misalignment calibration system (e.g., the misalignment calibration system 100 illustrated in FIG. 1) and/or a user of the system. For example, all or a subset of one or more steps of the routine 250 can be executed at least in part by one or more components of the misalignment calibration system, including a non-spatial camera, a high-precision translation stage, signal processing hardware and/or software, and/or storage media.

Figure 3:
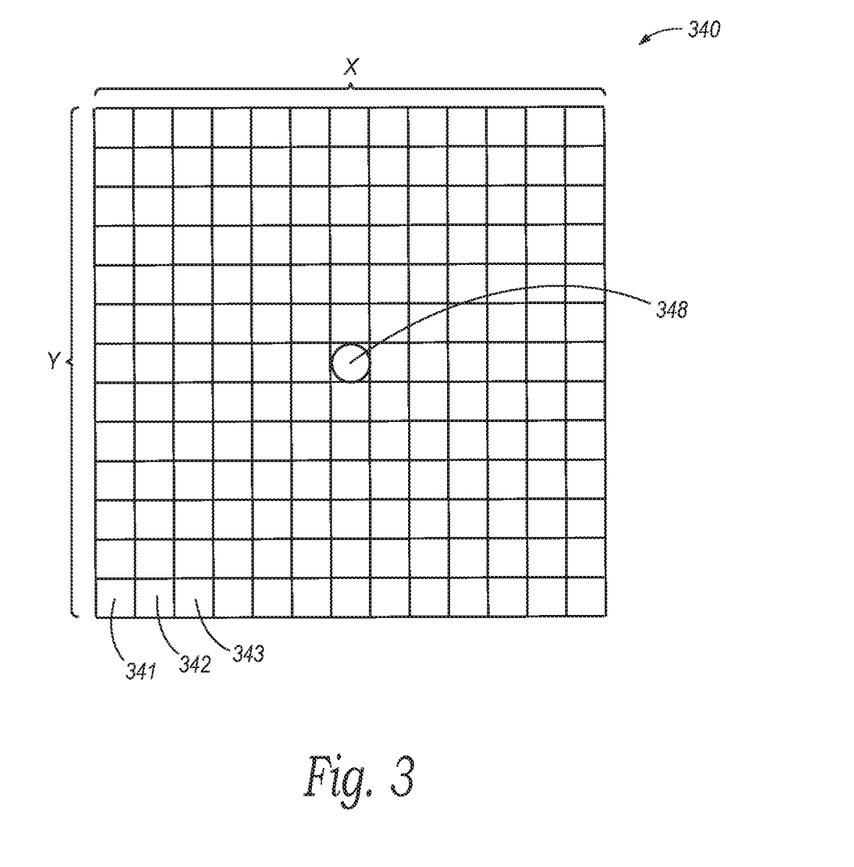
FIG. 3 is an example misalignment grid configured in accordance with various embodiments of the present technology.
Figure 4:
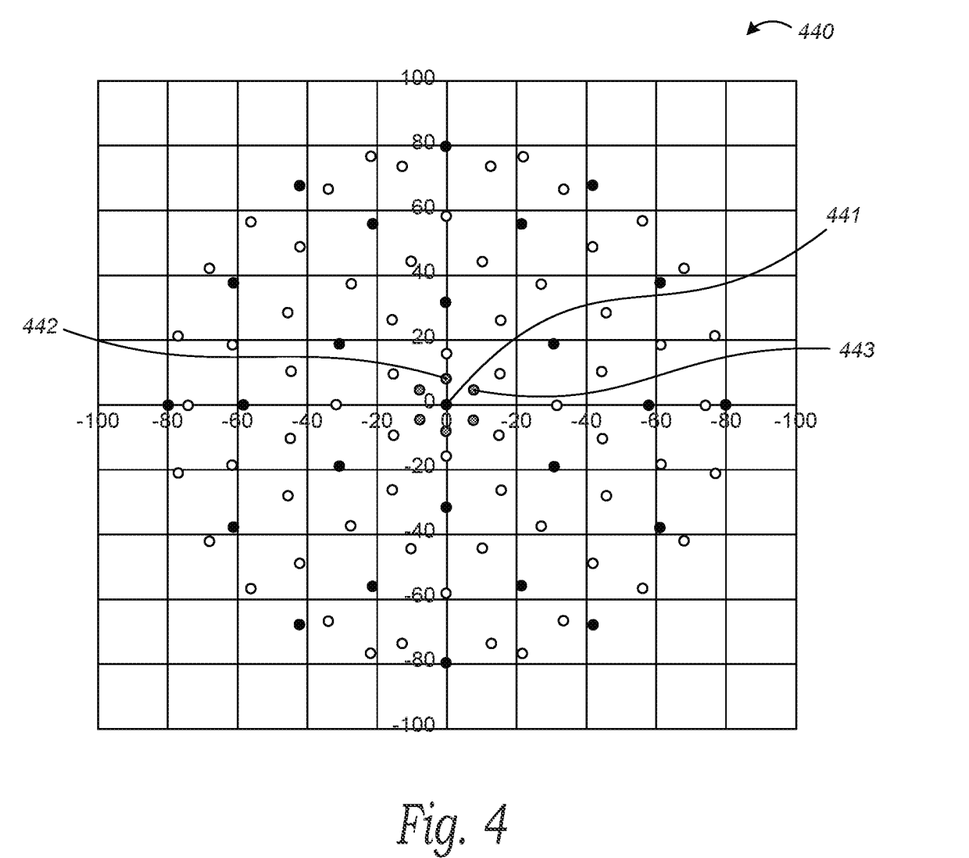
FIG. 4 is another example misalignment grid configured in accordance with various embodiments of the present technology.

For the sake of example only, the routine 250 is discussed in detail below with reference to FIGS. 3 and 4. FIGS. 3 and 4 illustrate example misalignment grids 340 and 440, respectively, configured in accordance with various embodiments of the present technology. Each square (e.g., square 341, 342, 343, etc.) of the misalignment grid 340 and/or each dot (e.g., dot 441, 442, 443, etc.) of the misalignment grid 440 represents a location within a FOV of a non-spatial camera of a misalignment calibration system at which the routine 250 can take one or more measurements of the DUT. In particular, the square 348 and the dot 441 in the grids 340 and 440, respectively, represent a location within the FOV of the non-spatial camera at which a DUT is fully aligned with the FOV. The remaining squares and dots in the grids 340 and 440, respectively, represent locations within the FOV at which the DUT is out of alignment (e.g., is misaligned with) the FOV of the non-spatial camera. The total area/volume covered by the grids 340 and 440 can represent a total calibration area/volume in some embodiments. For example, in one particular embodiment, if the length and width of the grid 340 is 1-2 mm, the total calibration area of the grid 340 can be 1-4 mm$^2$. As another example, in another particular embodiment, if the diameter of the grid 440 is 1-2 mm, the total calibration area of the grid 440 can be $\pi/4\pi$ mm$^2$. Furthermore, in this example, typical distances between measurement points in the grids 340 and/or 440 can be between 10 μm and 200 μm. Other grid dimensions, total calibration areas/volumes, and/or distances between measurement points of course exist and fall within the scope of embodiments of the present technology.

The grids 340 and 440 provide merely two example layouts of locations within the FOV at which the routine 250 can position and take measurements of the DUT. That is, one skilled in the art will readily recognize that the layout and number of measurement locations within a FOV of a non-spatial camera can be varied (e.g., based on several considerations, including calibration measurement cost, time, available equipment, size or shape of a desired calibration area, etc.) and remain within the scope of other embodiments of the present technology. In principal, any layout and number of measurement locations that (a) populates the interior of a desired calibration area/volume and (b) provides sufficient calibration information such that a measurement away from any measured grid point can be calibrated and corrected for misalignment orientation and/or magnitude using the calibration information is within the scope of embodiments of the present technology.

Furthermore, as described in greater detail below, the routine 250 can be configured to position and take measurements of the DUT at one or more locations within a FOV of a non-spatial camera in accordance with a defined and/or determined (e.g., predefined and/or predetermined) sequence of locations. For example, the routine 250 can be configured to position and measure the DUT at locations within the FOV of a non-spatial camera in the following order with respect to grid 340: square 348, square 341, square 342, square 343, etc. Alternatively, the routine 250 can be configured to position and measure the DUT at locations within the FOV of a non-spatial camera in the following order with respect to grid 440: dot 441, dot 442, dot 443, etc. One skilled in the art will readily recognize that the sequence of locations can be varied and remain within the scope of other embodiments of the present technology. For example, the routine 250 can be configured to position and measure the DUT at locations within the FOV of a non-spatial camera in the following order with respect to grid 340: square 341, square 342, square 343 . . . square 348, etc.

The routine 250 begins at block 251 by positioning a DUT at a first location within a FOV of a non-spatial camera. In some embodiments, the routine 250 uses a high-precision translation stage to position the DUT at the first location. The first location can correspond to a location within the FOV where the DUT and the FOV are fully aligned. For example, the first location can correspond to the square 348 in the grid 340 and/or to the dot 441 in the grid 440 at which the DUT is fully aligned with the FOV of the non-spatial camera. Alternatively, the first location can correspond to another square (e.g., the square 341) in the grid 340 and/or another dot (e.g., the dot 443) in the grid 440 at which the DUT is not fully aligned (e.g., is misaligned) with the FOV of the non-spatial camera. In these and other embodiments, the first location can be a first location in a sequence of locations within the FOV of the non-spatial camera. For example, the routine 250 can be configured to step through one or more of the locations within the FOV of the non-spatial camera (e.g., represented by the squares of the grid 340 and/or by the dots of the grid 440) in accordance with a defined (e.g., predefined) and/or determined (e.g., predetermined) order of locations and to capture measurements at each of the locations in the sequence. Once the routine 250 has positioned the DUT at the first location within the FOV of the non-spatial camera, the routine 250 proceeds to block 252.

At block 252, the routine 250 measures the DUT at the first location. In some embodiments, the routine 250 measures the DUT at the first location using the non-spatial camera to take (e.g., capture) one or more measurements of the DUT. For example, in embodiments where the non-spatial camera is a conoscope and the DUT is an infrared emitter, the routine 250 can measure the angular distribution of infrared light emitted by the DUT while the DUT is positioned at the first location. In embodiments where the first location corresponds to a location where the DUT is fully aligned with the FOV of the non-spatial camera, the routine 250 can establish the one or more measurements of the DUT taken by the non-spatial camera at the first location as a target or base measurement of the DUT. As described in greater detail below with respect to block 253, the routine 250 can use the target or base measurement to generate one or more calibration images.

At block 253, the routine 250 stores calibration data and the first location of the DUT in one or more entries of a misalignment calibration database. In some embodiments, the calibration data includes the one or more measurements of the DUT taken by the routine 250 at the first location. In these and other embodiments, the calibration data includes one or more calibration images (e.g., flat field calibration images) generated based at least in part on the one or more measurements of the DUT taken by the routine 250 at the first location (block 252). To generate calibration images, the routine 250, for each pixel of a measurement taken at block 252, generates and stores a ratio between (i) a pixel in a target or base measurement of the DUT (e.g., a pixel of a measurement of the DUT taken at block 252 with the DUT fully aligned with the FOV of the non-spatial camera) and (ii) a corresponding pixel of the measurement of the DUT at the first location. The routine 250 can store full resolution and/or reduced resolution versions of the one or more measurements and/or of the generated calibration images in the misalignment calibration database. For example, because the generated calibration images do not include high frequency variations, the routine 250 can store reduced resolution versions of the calibration images in the misalignment calibration database and can subsequently render the calibration images to full resolution with low-resolution data without loss of information.

In these and still other embodiments, the routine 250 can store the first location in the misalignment calibration database in a variety of formats. For example, the routine 250 can store the first location as coordinates (e.g., X, Y, and/or Z coordinates) corresponding to a position of the first location within the FOV of the non-spatial camera. Additionally, or alternatively, the routine 250 can store the first location as vectors (e.g., two-dimensional vectors, three-dimensional vectors, etc.) with respect to a specified position within (e.g., the center of) the FOV of the non-spatial camera.

At block 254, the routine 250 repositions the DUT at another location within the FOV of the non-spatial camera. For example, the routine 250 can reposition the DUT at a next location (e.g., a location following the first location or a previous location) in a defined (e.g., predefined) and/or determined (e.g., predetermined) order of locations within the FOV. In some embodiments, the routine 250 uses a high-precision translation stage to position the DUT at another location within the FOV. Once the routine 250 has positioned the DUT at the other location, the routine 250 proceeds to block 255.

At block 255, the routine 250 measures the repositioned DUT. In some embodiments, the routine 250 measures the repositioned DUT in a manner similar to the routine 250 at block 252. If the repositioned DUT at its new location is fully aligned with the FOV of the non-spatial camera, the routine 250 can establish the one or more measurements taken by the DUT at the new location as a target or base measurement of the DUT for use in generating one or more calibration images, as discussed above with respect to block 253.

At block 256, the routine 250 stores calibration data and the updated location of the DUT in one or more entries of a misalignment calibration database. In some embodiments, the routine 250 stores calibration data (e.g., the measurements and/or calibration images generated based at least in part on the measurements) and/or the current location of the DUT in the calibration misalignment database in a manner similar to the routine 250 at block 253.

At block 257, the routine 250 determines whether additional locations within the FOV and/or within a specified volume/area of the FOV remain at which the routine 250 has not captured measurements of the DUT. In some embodiments, the routine 250 determines whether additional locations remain by determining whether the current location of the DUT is the last location in a defined and/or determined sequence of locations. If the routine 250 determines that at least one additional location remain, the routine 250 can return to block 254 to reposition the DUT at an additional location. Otherwise, the routine 250 proceeds to block 258, and the routine 250 terminates.

Although the steps of the routine 250 are discussed and illustrated in a particular order, the routine 250 is not so limited. In other embodiments, the routine 250 can perform steps in a different order. For example, the routine 250 can generate one or more calibration images before, during, or after the routine 250 captures one or more measurements of the DUT at one or more locations within the FOV of the non-spatial camera. Furthermore, a person skilled in the art will readily recognize that the routine 250 can be altered and still remain within these and other embodiments of the present technology. For example, one or more steps illustrated in FIG. 2 can be omitted from and/or repeated within the routine 250 in some embodiments. Moreover, although the routine 250 is largely discussed above in the context of positioning a DUT at one or more locations within a FOV of a non-spatial camera along a two-dimensional grid, the routine 250 in other embodiments can position a DUT at one or more locations at any one or more points in three-dimensional space within a FOV of a non-spatial camera. Additionally, or alternatively, the routine 250 can position the DUT within and/or present the DUT to a FOV of a non-spatial camera at any one or more orientations. The routine 250 can store the three-dimensional location(s) and/or the orientation(s) of the DUT in the misalignment calibration database in a manner similar to the routine 250 at blocks 253 and 256.

Figure 5:
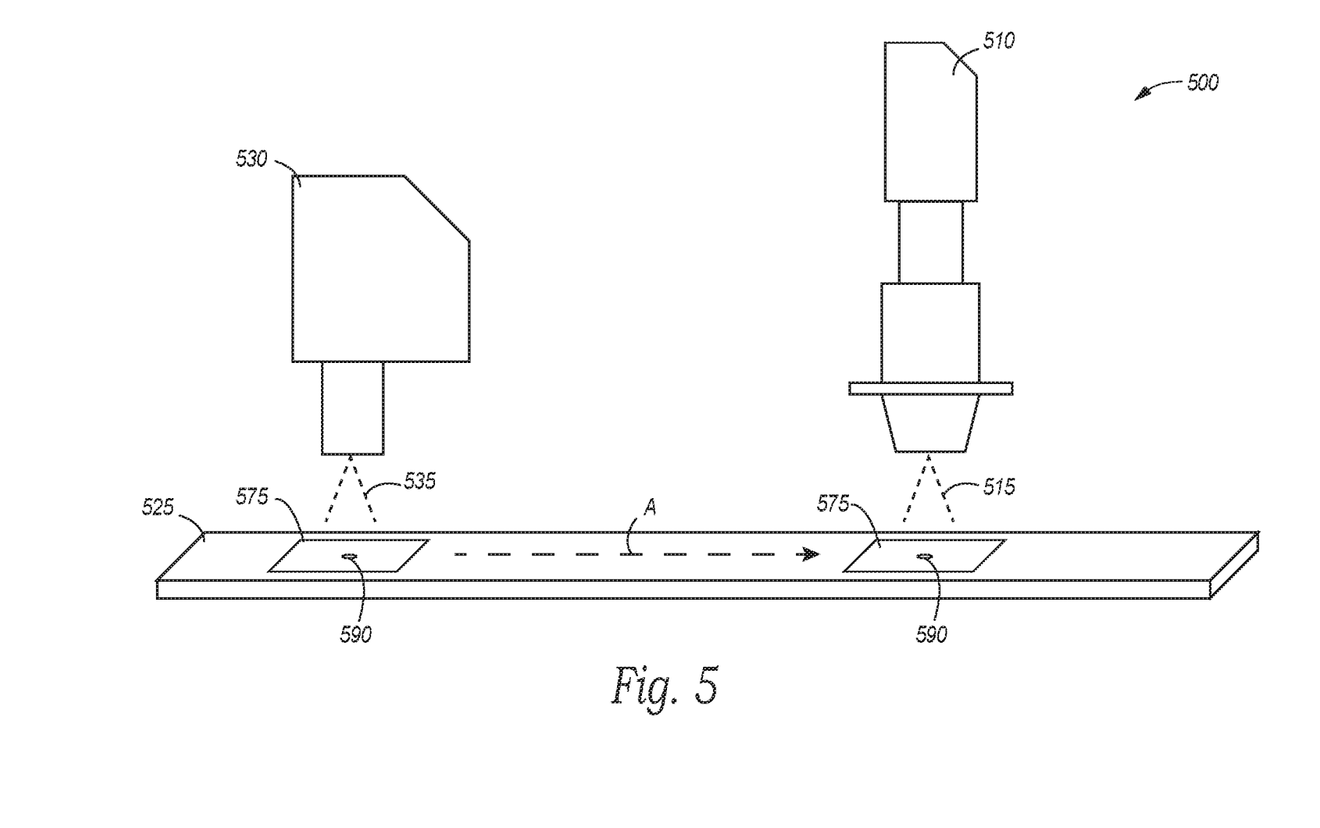
FIG. 5 is a schematic diagram of a non-spatial product inspection system configured in accordance with various embodiments of the present technology.

As discussed above, a misalignment calibration database generated by a misalignment calibration system (e.g., the misalignment calibration system 100 illustrated in FIG. 1) can subsequently be used by a product inspection system to calibrate (e.g., correct, adjust, etc.) measurements taken by a non-spatial camera of a DUT (e.g., the DUT 190) for any misalignment between the DUT and a FOV of the non-spatial camera. FIG. 5 is a schematic diagram of a non-spatial product inspection system 500 ("the inspection system 500" or "the system 500") configured in accordance with various embodiments of the present technology. As shown, the inspection system 500 includes a spatial machine or camera 530, a non-spatial machine or camera 510, a translation stage 525, and a carrier tray 575 ("the tray 575"). Although not shown so as to avoid unnecessarily obscuring the description of the embodiment of the technology, the system 500 can also include other hardware and/or components necessary for machine vision, including one or more processors, software, and/or output devices. For example, the system 500 can include signal processing hardware and/or software to analyze data (e.g., images, measurements, etc.) captured by the spatial camera 530 and/or by the non-spatial camera 510, and/or a display for providing feedback to a system user.

In operation, the inspection system 500 is configured to measure (e.g., inspect, evaluate, etc.) a DUT 590 (e.g., for defects and/or other characteristics). In some embodiments, the DUT 590 illustrated in FIG. 5 can be the same as the DUT 190 illustrated in FIG. 1. For example, the DUT 590 can be an infrared emitter or any other object and/or device that can be subjected to machine vision and/or inspection. In other embodiments, the DUT 590 can be different from (e.g., a different object and/or device than) the DUT 190.

The spatial camera 530 of the inspection system 500 is configured for (e.g., two-dimensional or three-dimensional) machine vision of spatial characteristics and/or features of a DUT 590. The spatial camera 530 is configured to capture still images or to record moving images of a scene and/or objects within a FOV 535. As noted above, the spatial camera 530, in some embodiments, can include and/or can be operably coupled to other hardware, software, and/or output devices. For example, the spatial camera 530 can be coupled to a computer (not shown) that includes signal processing hardware and/or software to analyze data (e.g., images) captured by the spatial camera 530. Additionally or alternatively, the spatial camera 530 can be coupled to one or more displays configured to provide feedback to a system user. In these and other embodiments, the spatial camera 530 can include onboard signal processing hardware and/or software and/or can include an onboard display. Furthermore, although the inspection system 500 is shown with a single spatial camera 530 in FIG. 5, the system 500 can include more than one spatial measurement device (e.g., more than one spatial camera 530) in other embodiments.

The non-spatial camera 510 of the inspection system 500 is configured for machine vision of non-spatial characteristics and/or features of a DUT 590. In some embodiments, the non-spatial camera 510 can be the same as or similar to the non-spatial camera 110 illustrated in FIG. 1. For example, the non-spatial camera 510 can be (i) a conoscope configured to measure an angular distribution of particular wavelengths of light emitted by the DUT 590 within a FOV 515 and/or (ii) another type of non-spatial measurement device configured to (a) transform an image from a spatial regime to a non-spatial regime (e.g., Fourier space, angular space, spectral space, etc.) and/or (b) measure other types of non-spatial characteristics and/or features of the DUT 590. In other embodiments, the non-spatial camera 510 can be another measurement device different than the non-spatial camera 110.

As noted above, the non-spatial camera 510, in some embodiments, can include and/or can be operably coupled to other hardware, software, and/or output devices. For example, the non-spatial camera 510 can be coupled to a computer (not shown) that includes signal processing hardware and/or software to analyze data (e.g., measurements) captured by the non-spatial camera 510. Additionally or alternatively, the non-spatial camera 510 can be coupled to one or more displays configured to provide feedback to a system user. In these and other embodiments, the non-spatial camera 510 can include onboard signal processing hardware and/or software and/or can include an onboard display. Furthermore, although the inspection system 500 is shown with a single non-spatial camera 510 in FIG. 5, the system 500 can include more than one non-spatial measurement device (e.g., more than one non-spatial camera 510) in other embodiments (e.g., to inspect the same and/or one or more other features of a DUT 590). Moreover, although the spatial camera 530 and the non-spatial camera 510 are illustrated as separate devices in FIG. 5, the spatial camera 510 and/or another spatial measurement system can be integrated into the non-spatial camera 510 in other embodiments of the present technology. For example, the non-spatial camera 510 can include a (e.g., semitransparent or reflective) mirror and optical measurement device configured to capture spatial information of objects positioned within the FOV 515 of the non-spatial camera 510.

In some embodiments, the tray 575 is a flat stage upon which a DUT 190 is placed. In these and other embodiments, the tray 575 can include clamps and/or stands (not shown) to fixedly position, orient, and/or hold the DUT 590 at a position on the tray 575. The translation stage 525 is configured to present the tray 575 and a DUT 590 positioned thereon to the spatial camera 530 and to the non-spatial camera 510. In this regard, the translation stage 525 can be configured to align the tray 575 with the FOV 535 of the spatial camera and with the FOV 515 of the non-spatial camera 510. As an example, the translation stage 525 can first align the tray 575 with the FOV 535 of the spatial camera 530 and subsequently align the tray 575 with the FOV 515 of the non-spatial camera 510 by translating and/or repositioning the tray 575 along arrow A illustrated in FIG. 5. In other embodiments, the translation stage 525 can align the tray 575 with the FOV 515 before aligning the tray 575 with the FOV 535. In still other embodiments where the spatial camera 530 is integrated into the non-spatial camera 510, the translation stage 525 can simultaneously align the tray 275 with the FOV 515 and the FOV 535.

In some embodiments, the translation stage 525 can be the same as or similar to the high-precision translation stage 120 illustrated in FIG. 1. In other embodiments, the translation stage 525 can differ from the high-precision translation stage 120. For example, because the tray 575 is significantly (e.g., 1.5 times, 2 times, 3 times, 5 times, 10 times, etc.) larger than the DUT 590 and because the tray 575 is presented to both the FOV 515 and the FOV 535 in the same manner across one or more measurements of one or more DUTs 590, the inspection system 500 does not require the translation stage 525 to have as high a degree of precision as the misalignment calibration system 100 illustrated in FIG. 1 requires of the high-precision translation stage 120. Thus, the degree of precision of the translation stage 525 can be much lower than the degree of precision of the high-precision translation stage 120, meaning that the cost of the translation stage 525 can be much lower than the cost of the high-precision translation stage 120.

As described in greater detail below, the inspection system 500 of FIG. 5 is configured to align the tray 575 carrying a DUT 590 with the FOV 535 of the spatial camera 530. In turn, the spatial camera 530 captures one or more measurements (e.g., images) that are used to determine a position of the DUT 590 on the tray 575. The inspection system 500 is further configured to align the tray 575 with the FOV 515 of the non-spatial camera 510, and the non-spatial camera 510 is configured to capture one or more measurements of the DUT 590 while the DUT 590 is positioned on the tray 575. Subsequently, the inspection system 500 (i) retrieves calibration data (e.g., one or more measurements and/or one or more calibration images corresponding to the determined position of the DUT 590 on the tray 575) from a misalignment calibration database and (ii) uses the calibration data to calibrate (e.g., adjust) the one or more measurements captured by the non-spatial camera 510 for any misalignment between the DUT and the FOV of the non-spatial camera. In this manner, the inspection system 500 obviates the practice of fully aligning a DUT 590 with the FOV 515 of the non-spatial camera 510 to capture one or more valid and/or accurate measurements of the DUT 590, thereby (a) reducing the cost of the system 500 and the time required to accurately measure a DUT 590 and (b) increasing inspection throughput of the system 500.

Figure 6:
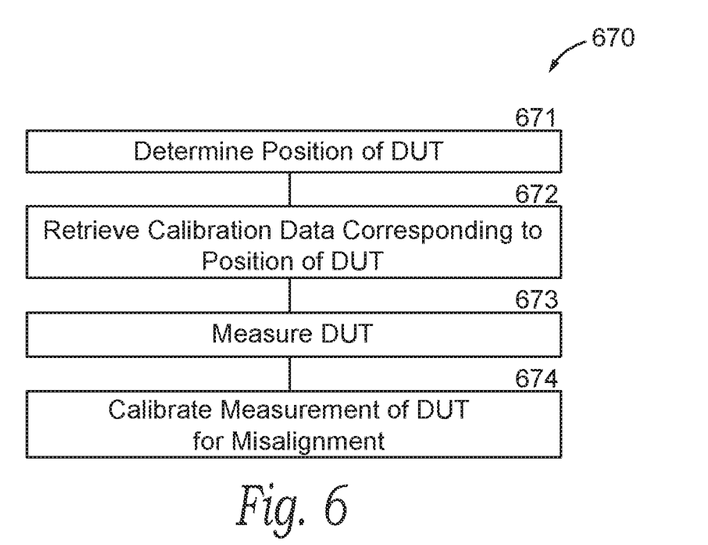
FIG. 6 is a flow diagram illustrating a routine for inspecting a DUT using a non-spatial misalignment calibration database configured in accordance with various embodiments of the present technology.

FIG. 6 is a flow diagram illustrating a routine 670 for inspecting a DUT using a non-spatial misalignment calibration database, configured in accordance with various embodiments of the present technology. In some embodiments, all or a subset of one or more steps of the routine 670 can be executed at least in part by a non-spatial product inspection system (e.g., the non-spatial product inspection system 500 illustrated in FIG. 5) and/or a user of the system. For example, all or a subset of one or more steps of the routine 670 can be executed at least in part by one or more components of the inspection system, including a spatial camera, a non-spatial camera, a translation stage, a carrier tray, signal processing hardware and/or software, and/or storage media.

The routine 670 begins at block 671 by determining a position of a DUT. In some embodiments, the routine 670 determines a position of the DUT using a spatial camera separate from the non-spatial camera. For example, the routine 670 can position the DUT on a carrier tray, and can align the carrier tray with a FOV of the spatial camera. In turn, the routine 670 can use the spatial camera to capture one or more images of the DUT and the tray, and the routine 670 can determine the position of the DUT on the tray using the images. In other embodiments, the routine 670 determines a position of the DUT using a spatial camera or measurement device built into the non-spatial camera. In these embodiments, the routine 670 can position the DUT on a carrier tray, and can align the carrier tray with a FOV of the non-spatial camera (which also aligns the carrier tray with a FOV of the spatial camera/measurement device built into the non-spatial camera). In turn, the routine 670 can use the spatial camera/measurement device to capture one or more images or measurements of the DUT and the tray, and the routine 670 can determine the position of the DUT on the tray using the images or measurements.

In some embodiments, the routine 670 determines the position of the DUT relative to a specified location and/or relative to a FOV of the non-spatial camera. For example, the routine 670 can determine the position of the DUT relative to the center of the carrier tray, relative to one or more edges of the tray, and/or relative to another point (e.g., a point where the DUT would be fully aligned with the FOV of the non-spatial camera). In these and other embodiments, the routine 670 determines the position of the DUT with respect to a coordinate position, such as a two-dimensional or three-dimensional coordinate system used to describe and identify positions within the FOV of the non-spatial camera.

At block 672, the routine 670 retrieves misalignment calibration data from a misalignment calibration database corresponding to the position of the DUT determined at block 671. In some embodiments, the routine 670 retrieves misalignment calibration data from the misalignment calibration database corresponding to a location at or nearest the determined position of the DUT for which the misalignment calibration database includes calibration data. For example, if the routine 670 determines that the misalignment calibration database includes misalignment calibration data that was generated from one or more measurements taken at the same location as the position of the DUT determined at block 671, the routine 670 can retrieve the misalignment calibration data corresponding to the same location from the misalignment database. Additionally, or alternatively (e.g., if the routine 670 determines that the misalignment calibration database does not include misalignment calibration data that was generated from one or more measurements taken at the same location as the position of the DUT determined at block 671), the routine 670 can retrieve misalignment calibration data corresponding to a location near (e.g., nearest, immediately adjacent, neighboring, etc.) the position of the DUT determined at block 671. In these and other embodiments, the routine 670 can retrieve misalignment calibration data from the misalignment calibration database corresponding to multiple locations (e.g., two, three, four, or more locations) that are at or near (e.g., nearest, immediately adjacent, neighboring within a threshold distance, etc.) the position of the DUT determined at block 671.

In some embodiments, the misalignment calibration data retrieved from misalignment calibration database by the routine 670 includes one or more calibration images. In these embodiments, the calibration images can be full-resolution or reduced-resolution calibration images. In the event one or more of the retrieved calibration images are reduced-resolution calibration images, the routine 670 can render the calibration images to full-resolution. In these and other embodiments, the misalignment calibration data retrieved from the misalignment calibration database by the routine 670 includes one or more measurements of a DUT taken by a non-spatial camera (e.g., in accordance with discussion above with respect to blocks 252 and 255 of the routine 250 illustrated in FIG. 2). In these embodiments, the routine 670 can generate calibration images using the one or more measurements in a manner similar to the routine 250 at block 253 discussed in detail above with respect to FIG. 2.

At block 673, the routine 670 measures the DUT using the non-spatial camera. In some embodiments, the routine 670 measures the DUT in a manner similar to the routine 250 at blocks 252 and 255 discussed in detail above with respect to FIG. 2. For example, in embodiments where the non-spatial camera is a conoscope and the DUT is an infrared emitter, the routine 670 can measure the angular distribution of infrared light emitted by the DUT.

At block 674, the routine 670 calibrates the one or more measurements of the DUT taken at block 673 with the misalignment calibration data retrieved from the misalignment calibration database at block 672. In embodiments where the retrieved misalignment calibration data corresponds to a single location (e.g., the same location as or a location proximate the position of the DUT determined at block 671), the routine 670 calibrates a measurement of the DUT taken at block 673 by, for each pixel in the measurement, multiplying a pixel in the measurement by the corresponding pixel in a full-resolution calibration image of the retrieved misalignment calibration data. The resulting image is a calibrated measurement that reflects a measurement of the DUT that would have been captured had the DUT and the FOV of the non-spatial camera been fully aligned (within appropriate margins of error). That is, the resulting image provides a more accurate measurement of the DUT because it accounts for any misalignment between the DUT and the FOV of the non-spatial camera using a known measurement of the DUT at a location at or near the position of the DUT determined at block 671.

In embodiments where the retrieved misalignment calibration data corresponds to multiple locations (e.g., multiple locations at or near the position of the DUT determined at block 571), the routine 670 can generate an aggregate calibration image. For example, the routine 670 can, for each pixel in the full-resolution calibration images of the retrieved misalignment calibration data, use linear interpolation, polynomial interpolations, or other techniques to generate a corresponding pixel value (e.g., ratio value) for the aggregate calibration image. After the routine 670 generates the aggregate calibration image, the routine 670 calibrates a measurement of the DUT taken at block 673 by, for each pixel in the measurement, multiplying a pixel in the measurement by the corresponding pixel in the aggregate calibration image. The resulting image is a calibrated measurement that reflects a measurement of the DUT that would have been captured had the DUT and the FOV of the non-spatial camera been fully aligned (within appropriate margins of error). That is, the resulting image provides a more accurate measurement of the DUT because it accounts for any misalignment between the DUT and the FOV of the non-spatial camera using known measurements of the DUT at locations at and/or near the position of the DUT determined at block 671.

Although the steps of the routine 670 are discussed and illustrated in a particular order, the routine 670 is not so limited. In other embodiments, the routine 670 can perform steps in a different order. For example, the routine 670 can determine a position of the DUT relative to the FOV of the non-spatial camera and/or retrieve calibration data corresponding to the determined position of the DUT before, during, and/or after the non-spatial camera takes one or more measurements of the DUT. Furthermore, a person skilled in the art will readily recognize that the routine 670 can be altered and still remain within these and other embodiments of the present technology. For example, one or more steps illustrated in FIG. 6 can be omitted from and/or repeated within the routine 670 in some embodiments. As another example, the routine 670 can determine an orientation of a DUT (e.g., relative to a FOV of the non-spatial camera) in addition to or in lieu of determining the position of the DUT on the carrier tray at block 671. In these embodiments, the routine 670 can retrieve calibration data from the misalignment calibration database corresponding to the determined orientation of the DUT and/or to the determined position of the DUT on the carrier tray. In this manner, the routine 670 can calibrate measurements of the DUT for any misalignment in orientation of the DUT relative to the FOV of the non-spatial camera.

Although not shown so as to avoid unnecessarily obscuring the description of the embodiments of the technology, any of the forgoing systems and methods described above in FIGS. 1-6 can include and/or be performed by a computing device configured to direct and/or arrange components of the systems and/or to receive, arrange, store, analyze, and/or otherwise process data received, for example, from the machine and/or other components of the systems. As such, such a computing device includes the necessary hardware and corresponding computer-executable instructions to perform these tasks. More specifically, a computing device configured in accordance with an embodiment of the present technology can include a processor, a storage device, input/output device, one or more sensors, and/or any other suitable subsystems and/or components (e.g., displays, speakers, communication modules, etc.). The storage device can include a set of circuits or a network of storage components configured to retain information and provide access to the retained information. For example, the storage device can include volatile and/or non-volatile memory. As a more specific example, the storage device can include random access memory (RAM), magnetic disks or tapes, and/or flash memory.

The computing device can also include computer readable media (e.g., the storage device, disk drives, and/or other storage media, excluding only a transitory, propagating signal per se) including computer-executable instructions stored thereon that, when executed by the processor and/or computing device, cause the systems to locate, measure, calibrate, and/or analyze a DUT as described in detail above with reference to FIGS. 1-6. Moreover, the processor can be configured for performing or otherwise controlling steps, calculations, analysis, and any other functions associated with the methods described herein.

In some embodiments, the storage device can store one or more databases used to store data collected by the systems as well as data used to direct and/or adjust components of the systems. In one embodiment, for example, a database is an HTML file designed by the assignee of the present disclosure. In other embodiments, however, data is stored in other types of databases or data files.

One of ordinary skill in the art will understand that various components of the systems (e.g., the computing device) can be further divided into subcomponents, or that various components and functions of the systems may be combined and integrated. In addition, these components can communicate via wired and/or wireless communication, as well as by information contained in the storage media.

C. Additional Examples

Several aspects of the present technology are set forth in the following examples.

1. A method for generating a misalignment calibration database, the method comprising:
    positioning an emitting source at a first location within a field of view (FOV) of a non-spatial measurement device;
    measuring the emitting source at the first location using the non-spatial measurement device to generate first calibration data; and
    storing the first calibration data and the first location in one or more first entries of a misalignment calibration database, wherein the one or more first entries associate the first calibration data with the first location.

2. The method of example 1, further comprising:
    repositioning the emitting source at a second location within the FOV, wherein the second location is different than the first location;
    measuring the emitting source at the second location using the non-spatial measurement device to generate second calibration data; and
    storing the second calibration data and the second location in one or more second entries of the misalignment calibration database, wherein the one or more second entries associate the second calibration data with the second location.

3. The method of example 2 wherein the second calibration data includes a calibration image, and wherein the method further comprises generating the calibration image, and further wherein generating the calibration image includes, for each pixel of a measurement of the emitting source at the second location:
    generating a ratio between (i) a pixel value of a target measurement of the emitting source and (ii) a corresponding pixel value of the measurement of the emitting source at the second location; and
    setting the generated ratio as a corresponding pixel value of the calibration image.

4. The method of example 3 wherein the first location is a location within the FOV of the non-spatial measurement device at which the emitting source is fully aligned with the FOV, and wherein the method further comprises establishing a measurement of the emitting source at the first location as the target measurement of the emitting source.

5. The method of example 3 or example 4 wherein storing the second calibration data includes storing a reduced resolution version of the calibration image in the one or more second entries of the misalignment calibration database.

6. A system for generating a misalignment calibration database, the system comprising:
    a non-spatial measurement device having a field of view (FOV) and configured to measure a non-spatial characteristic of an emitting source positioned within the FOV; and a high-precision translation stage configured to position, within a specified degree of precision, the emitting source at multiple locations within the FOV of the non-spatial measurement device, wherein the system is configured to— position the emitting source at a first location within the FOV of the non-spatial measurement device using the high-precision translation stage, measure the emitting source at the first location using the non-spatial measurement device to generate first calibration data, and store the first calibration data and the first location in one or more first entries of a misalignment calibration database, wherein the one or more first entries associate the first calibration data with the first location.

7. The system of example 6 wherein the system is further configured to:

reposition the emitting source at a second location within the FOV of the non-spatial measurement device using the high-precision translation stage, wherein the second location is different than the first location;

measure the emitting source at the second location using the non-spatial measurement device to generate second calibration data; and store the second calibration data and the second location in one or more second entries of the misalignment calibration database, wherein the one or more second entries associate the second calibration data with the second location.

8. The system of example 7 wherein the second calibration data includes a calibration image, and wherein the system is further configured to generate the calibration image, and further wherein, to generate the calibration image, the system is configured to for each pixel of a measurement of the emitting source at the second location:

generate a ratio between (i) a pixel value of a target measurement of the emitting source and (ii) a corresponding pixel value of the measurement of the emitting source at the second location; and set the generated ratio as a corresponding pixel value of the calibration image.

9. The system of example 8 wherein the first location is a location within the FOV of the non-spatial measurement device at which the emitting source is fully aligned with the FOV, and wherein the system is further configured to establish a measurement of the emitting source at the first location as the target measurement of the emitting source.

10. The system of example 8 or example 9 wherein, to store the second calibration data, the system is configured to store a reduced resolution version of the calibration image in the one or more second entries of the misalignment calibration database.

11. A method for measuring a device under test (DUT), the method comprising:

determining a position of a DUT within a field of view (FOV) of a non-spatial measurement device;

measuring the DUT using the non-spatial measurement device while the DUT is at the position to generate a measurement; and calibrating, using at least one calibration image that corresponds to the determined position, the measurement for misalignment between the DUT at the position and the FOV of the non-spatial measurement device.

12. The method of example 11, further comprising retrieving one or more calibration images from a misalignment calibration database, wherein:

the one or more calibration images include or are used to generate the at least one calibration image;

the one or more calibration images were generated from one or more measurements of an emitting source taken at one or more locations within a FOV of a second non-spatial measurement device; and the one or more locations are identical and/or proximate to the position of the DUT within the FOV of the non-spatial measurement device.

13. The method of example 11 wherein:

retrieving the one or more calibration images includes retrieving at least two calibration images;

the at least one calibration image is an aggregate calibration image; and the method further comprises generating the aggregate calibration image by, for each pixel in a first calibration image of the at least two calibration images, generating a corresponding pixel value of the aggregate calibration image using linear interpolation or polynomial interpolation between (i) a pixel value in the first calibration image and (ii) one or more corresponding pixel values in one or more other calibration images of the at least two calibration images.

14. The method of any one of examples 11-13 wherein calibrating the measurement using the at least one calibration image includes, for each pixel of the measurement, multiplying a pixel value of the measurement by (a) a corresponding pixel value of the at least one calibration image or (b) a corresponding pixel value of an/the aggregate calibration image generated from the at least one calibration image.

15. The method of any one of examples 11-14, further comprising rendering the at least one calibration image to full resolution.

16. The method of any one of examples 11-15, further comprising determining an orientation of the DUT relative to the FOV of the non-spatial measurement device, wherein the at least one calibration image corresponds to the determined orientation of the DUT.

17. A system for measuring a device under test (DUT), the system comprising:

a non-spatial measurement device having a field of view (FOV) and configured to measure a non-spatial characteristic of the DUT when the DUT is positioned within the FOV;

a carrier tray configured to hold or support the DUT; and a translation stage configured to align the carrier tray with the FOV of the non-spatial measurement device, wherein the system is configured to— measure the DUT using the non-spatial measurement device while the DUT is at a first position to generate a first measurement; and calibrate, using a calibration image that corresponds to the position, the measurement for misalignment between the DUT at the position and the FOV of the non-spatial measurement device.

18. The system of example 17, further comprising a spatial measurement device configured to determine the position of the DUT.

19. The system of example 17 or example 18 wherein the non-spatial measurement device is a first non-spatial measurement device, and wherein the system is further configured to retrieve the calibration image from a misalignment calibration database, and wherein the calibration image is generated from a measurement of an emitting source taken, within a FOV of a second non-spatial measurement device, at one or more locations identical and/or proximate to the position of the DUT within the FOV of the first non-spatial measurement device.

20. The system of any one of examples 17-19 wherein, to calibrate the measurement using the calibration image, the system is configured to, for each pixel of the measurement, multiplying a pixel value of the measurement by a corresponding pixel value of the calibration image to generate a corresponding pixel value of a calibrated measurement.

21. A method for calibrating a first non-spatial measurement of a first device under test (DUT) taken while the DUT is positioned at a first position within a field of view (FOV) of a first non-spatial measurement device, the method comprising:
obtaining a calibration image, wherein:
the calibration image corresponds to the first position, and
the calibration image is generated based on at least one measurement of a second DUT taken at at least one identical and/or proximate location within a FOV of a second non-spatial measurement device to the first position of the first DUT within the FOV of the first non-spatial measurement device; and
generating a first calibrated non-spatial measurement of the DUT by, for each pixel value in the first non-spatial measurement, multiplying a pixel value of the first non-spatial measurement by a corresponding pixel value of the calibration image to produce a corresponding pixel value of the first calibrated non-spatial measurement.

22. The method of example 21 wherein:
the calibration image is an aggregate calibration image;
the at least one measurement of the second DUT includes two or more measurements of the second DUT; and
the method further comprises generating the aggregate calibration image by:
for each of the two or more measurements, generating a corresponding calibration image; and
for each pixel in a first corresponding calibration image of the corresponding calibration images, generating a corresponding pixel value of the aggregate calibration image using linear interpolation or polynomial interpolation between (i) a pixel value in the first corresponding calibration image and (ii) one or more corresponding pixels values in one or more other corresponding calibration images of the corresponding calibration images.

23. The method of example 22 wherein, to generate each corresponding calibration image, the method further comprises, for each pixel of each measurement of the two or more measurements:
generating a ratio between (i) a pixel value of a target measurement of the second DUT and (ii) a corresponding pixel value of a measurement of the two or more measurements; and
setting the generated ratio as a corresponding pixel value of a corresponding calibration image of the measurement of the two or more measurements.

24. The method of example 21 wherein the first non-spatial measurement device is different than the second non-spatial measurement device 25. A tangible, non-transitory computer-readable medium storing instructions thereon that, when executed by one or more processors of a product inspection system, cause the product inspect system to perform operations for calibrating non-spatial measurements of a device under test (DUT), the operations comprising:
obtaining a calibration image, the calibration image corresponding to a determined position of a DUT within a field of view (FOV) of a non-spatial measurement device; and
calibrating a measurement of the DUT for a misalignment magnitude and/or a misalignment orientation between the DUT and the FOV of the non-spatial measurement device, wherein the measurement is a non-spatial measurement of the DUT captured using the non-spatial measurement device while the DUT is positioned at the determined position.

26. The tangible, non-transitory computer-readable medium of example 25 wherein calibrating the measurement of the DUT includes, for each pixel value in the non-spatial measurement, multiplying a pixel value of the non-spatial measurement by a corresponding pixel value of the calibration image to produce a corresponding pixel value of a calibrated non-spatial measurement of the DUT.

27. The tangible, non-transitory computer-readable medium of example 25 or example 26 wherein obtaining the calibration image includes—
retrieving at least one non-spatial measurement from the misalignment calibration database and generating the calibration image based at least in part on the at least one non-spatial measurement;
retrieving the calibration image from a misalignment calibration database; and/or
rendering the calibration image to full resolution.

28. The tangible, non-transitory computer-readable medium of any one of examples 25-27 wherein the operations further comprise determining the determined position of the DUT within the FOV of the non-spatial measurement device.

29. A tangible, non-transitory computer-readable medium storing instructions thereon that, when executed by one or more processors of a misalignment calibration system, cause the misalignment calibration system to perform operations for calibrating non-spatial measurements of a device under test (DUT), the operations comprising:
capturing a first non-spatial measurement of a DUT at a first location within a field of view (FOV) of a non-spatial measurement device;
storing (a) the first non-spatial measurement and/or a representation of the first non-spatial measurement and (b) the first location in one or more first entries of a misalignment calibration database, wherein the one or more first entries associate the first non-spatial measurement and/or the representation of the first non-spatial measurement with the first location;
capturing a second non-spatial measurement of the DUT at a second location within the FOV of the non-spatial measurement device; and
storing (a) the second non-spatial measurement and/or a representation of the second non-spatial measurement of the DUT and (b) the second location in one or more second entries of the misalignment calibration database, wherein the one or more second entries associate the second non-spatial measurement and/or the representation of the second non-spatial measurement with the second location.

30. The tangible, non-transitory computer-readable medium of example 29 wherein the operations further comprise:
generating a first calibration image based at least in part on the first non-spatial measurement of the DUT, wherein generating the first calibration image includes— for each pixel of the first non-spatial measurement, calculating a ratio between (i) a pixel value of a target measurement of the DUT and (ii) a corresponding pixel value of the first non-spatial measurement of the DUT; and setting each generated ratio as a corresponding pixel value of the first calibration image; and storing the first calibration image in the one or more first entries of the misalignment calibration database, wherein the first calibration image is the representation of the first non-spatial measurement.

31. The tangible, non-transitory computer-readable medium of example 29 wherein the operations further comprise:

positioning the DUT at the first location; and position the DUT at the second location.

D. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A method for measuring a device under test (DUT), the method comprising:

determining a position of a DUT within a field of view (FOV) of a non-spatial measurement device;

measuring the DUT using the non-spatial measurement device while the DUT is at the position to generate a measurement; and calibrating, using at least one calibration image that corresponds to the determined position, the measurement for spatial misalignment between the DUT at the position and the FOV of the non-spatial measurement device.

2. The method of claim 1, further comprising retrieving one or more calibration images from a misalignment calibration database, wherein:

the one or more calibration images include or are used to generate the at least one calibration image;

the one or more calibration images were generated from one or more measurements of an emitting source taken at one or more locations within a FOV of a second non-spatial measurement device; and the one or more locations are identical and/or proximate to the position of the DUT within the FOV of the non-spatial measurement device.

3. The method of claim 1 wherein:

retrieving the one or more calibration images includes retrieving at least two calibration images;

the at least one calibration image is an aggregate calibration image; and the method further comprises generating the aggregate calibration image by, for each pixel in a first calibration image of the at least two calibration images, generating a corresponding pixel value of the aggregate calibration image using linear interpolation or polynomial interpolation between (i) a pixel value in the first calibration image and (ii) one or more corresponding pixel values in one or more other calibration images of the at least two calibration images.

4. The method of any one of claims 1-3 wherein calibrating the measurement using the at least one calibration image includes, for each pixel of the measurement, multiplying a pixel value of the measurement by (a) a corresponding pixel value of the at least one calibration image or (b) a corresponding pixel value of an/the aggregate calibration image generated from the at least one calibration image.

5. The method of claim 1, further comprising rendering the at least one calibration image to full resolution.

6. The method of claim 1, further comprising determining an orientation of the DUT relative to the FOV of the non-spatial measurement device, wherein the at least one calibration image corresponds to the determined orientation of the DUT.

7. The method of claim 1, further comprising retrieving one or more calibration images from a misalignment calibration database using the determined position of the DUT.

8. A system for measuring a device under test (DUT), the system comprising:

a non-spatial measurement device having a field of view (FOV) and configured to measure a non-spatial characteristic of the DUT when the DUT is positioned within the FOV;

a carrier tray configured to hold or support the DUT; and a translation stage configured to align the carrier tray with the FOV of the non-spatial measurement device, wherein the system is configured to—
- measure the DUT using the non-spatial measurement device while the DUT is at a position to generate a measurement; and
- calibrate, using a calibration image that corresponds to the position, the measurement for spatial misalignment between the DUT at the position and the FOV of the non-spatial measurement device.

9. The system of claim 8, further comprising a spatial measurement device configured to determine the position of the DUT.

10. The system of claim 8 or claim 9 wherein the non-spatial measurement device is a first non-spatial measurement device, and wherein the system is further configured to retrieve the calibration image from a misalignment calibration database, and wherein the calibration image is generated from a measurement of an emitting source taken, within a FOV of a second non-spatial measurement device, at one or more locations identical and/or proximate to the position of the DUT within the FOV of the first non-spatial measurement device.

11. The system of claim 8 wherein, to calibrate the measurement using the calibration image, the system is configured to, for each pixel of the measurement, multiplying a pixel value of the measurement by a corresponding pixel value of the calibration image to generate a corresponding pixel value of a calibrated measurement.

12. The system of claim 8 wherein the system is further configured to retrieve the calibration image from a misalignment calibration database using the position of the DUT.

* * * * *